United States Patent [19]
Chapman

[11] Patent Number: 4,778,682
[45] Date of Patent: Oct. 18, 1988

[54] METHOD OF PREPARING A LOW-FAT, LOW-CHOLESTEROL RAW MEAT PRODUCT

[76] Inventor: Dallas V. Chapman, 200 Union St., The Junction, Newcastle, N.S.W. 2300, Australia

[21] Appl. No.: 46,886
[22] PCT Filed: Jun. 27, 1986
[86] PCT No.: PCT/AU86/00185
 § 371 Date: Feb. 25, 1987
 § 102(e) Date: Feb. 25, 1987
[87] PCT Pub. No.: WO87/00010
 PCT Pub. Date: Jan. 15, 1987

[30] Foreign Application Priority Data
 Jun. 28, 1985 [AU] Australia .................................. 01263
 Sep. 30, 1985 [AU] Australia .................................. 02677

[51] Int. Cl.⁴ .................... A23L 1/025; A23L 1/317
[52] U.S. Cl. ...................... 426/248; 426/480; 426/646
[58] Field of Search ............ 426/248, 641, 646, 480, 426/518, 417, 804

[56] References Cited
U.S. PATENT DOCUMENTS

| | | |
|---|---|---|
| 2,932,573 | 4/1960 | Reiman .................... 426/248 |
| 3,033,687 | 5/1962 | Harper et al. .............. 426/646 |
| 3,215,537 | 11/1965 | Wharton et al. ............ 426/248 |
| 3,447,932 | 6/1969 | Olson et al. ............... 426/646 |
| 3,565,637 | 2/1971 | Artar ....................... 426/646 |
| 3,740,235 | 6/1973 | Weiner ..................... 426/646 |
| 3,761,283 | 9/1973 | Snyder .................... 426/248 X |
| 4,233,323 | 11/1980 | Sway et al. ............... 426/248 X |

FOREIGN PATENT DOCUMENTS

| | | |
|---|---|---|
| 0052078 | 5/1982 | European Pat. Off. . |
| 81 5932 | of 1983 | South Africa . |
| 1576813 | 10/1980 | United Kingdom . |

OTHER PUBLICATIONS

Pavlovskiy, P. Ye., Biochimiya myasa i myasoproductov (The biochemistry of meat and meat products), Moscow Pishtchepromizdat, 1963, p. 265. (translation attached).
Spravochnik technologii myasnych i technicheskich productov (Handbook of meat and technical products), Moscow, Pishtchepromizdat, 1973, p. 27. (translation attached).

Primary Examiner—Arthur L. Corbin
Attorney, Agent, or Firm—Vorys, Sater, Seymour and Pease

[57] ABSTRACT

Method for lowering fat and cholesterol levels in meat comprising the steps of (a) exposing a thin layer of meat to ultraviolet light, (b) comminuting the meat in a chilled bowl with the addition of a quantity of iced water, edible acid, salt and food phosphates until a quantity of fat and cholesterol separate from the meat emulsion and adhere to the inner surface of the cold bowl. The present invention also relates to a meat product free of added carbohydrates, artificial colorings and artificial preservatives wherein the fat portion is reduced 1-2% and the cholesterol portion is reduced by 10-60% from the levels present in the trimmed meat.

8 Claims, No Drawings

METHOD OF PREPARING A LOW-FAT, LOW-CHOLESTEROL RAW MEAT PRODUCT

BACKGROUND OF THE INVENTION

1. Field of the Invention

The present invention relates to a commercially viable method for extracting a substantial portion of the fat and cholesterol components from meat, and to meat products produced by such method.

2. Description of the Prior Art

Medical research has shown that an over consumption of fats and cholesterol in the diet can contribute to heart disease, obesity and other ailments. In response, the public has to an extent turned away from the consumption of red meat to alternative sources of protein such as to be found in white meats or vegetable proteins.

Present smallgoods such as sausages and hamburger meat are high in fat and cholesterol and are generally not recommended for persons suffering from heart disease obesity, and other ailments.

SUMMARY OF THE INVENTION

The present invention seeks to substantially overcome the problems now associated with a diet high in fats and cholesterol by providing a meat product having substantially reduced portions of fat and cholesterol than presently available in meat products and to a method of making such a meat product.

By the method of the present invention it is possible to produce meat products free of carbohydrates, artificial colorings and artificial preservatives, and which are ideally suited for general consumption.

In addition it has been found that when mutton is treated by the method of the present invention it is rendered acceptable to persons who previously had rejected mutton because of its characteristic smell and taste.

In one broad aspect of the present invention there is provided a method for extracting a substantial portion of the fat and cholesterol components from meat comprising the steps of:

(a) exposing a thin layer of meat to ultraviolet light; and (b) comminuting the meat in a chilled bowl with the addition of a quantity of iced water, edible acid, salt and food phosphates until a quantity of fat and cholesterol separate from the meat emulsion and adhere to the inner surface of the cold bowl.

DETAILED DESCRIPTION OF THE INVENTION AND PREFERRED EMBODIMENTS

Preferably the meat is minced and loosely packed on a tray to a maximum thickness of 25 mm.

Preferably the bowl is kept at a temperature of $-10°$ to $+10°$ C., between 1 and 5 liters of iced water, 50–100 gm acetic acid, 100–200 gms salt (Nace) and 20–50 gm EMELKUT (Trade name) (edible phosphates) are added during the comminuting step for every 10 kg of trimmed meat.

In a further aspect of the present invention there is provided a meat product free of added carbohydrates, artificial colorings and artificial preservatives wherein the fat portion is reduced to 1–2% and the cholesterol portion is reduced by 10–60% from the levels present in the trimmed meat.

Examples of an edible acid are acetic acid and citric acid.

The present invention will be further described by reference to the following non-limiting examples.

Three 10 kg samples of fresh raw minced mutton were taken after boning and trimming but before any further processing took place.

Sample 1 was left as a standard.
Sample 2 was then treated as in Example 1.
Sample 3 was then treated as in Example 2.

EXAMPLE 1

A single low intensity ultraviolet germicidal lamp of 2220 microwatts/cm$^2$ at 25 mm rating, catalogue number G24T7H was used and a tray of loosely packed meat of maximum thickness 25 mm, spread out on a metal tray 28 cm×50 cm, was placed 75 mm below the lamp. The long axis of the tray was under the lamp and the meat was exposed to the ultraviolet lamp for 12 hours.

The meat sample 2 was placed in a rotating bowl ("silent cutter") previously chilled to 3° C. 3.5 liters of iced water and 50 gm of acetic acid were added to solubilize the globulin and the meat emulsion comminuted for about 2 minutes. A 100 gm of salt and 25 gm of a food phosphate EMELKUT (Trade name) (a mixture of sodium tripolyphosphate, tetra sodium pyro phosphate and meta phosphate) were then added to solubilize the meat protein and to enhance the self binding properties of the meat mass and the mixture comminuted for a further three minutes.

Fat and water insoluble vitamin D3 adhered to the inner surface of the bowl and the meat mass was removed.

EXAMPLE 2

Three high intensity ultraviolet germicidal lamps of 8350 microwatts/cm$^2$ at 25 mm rating, catalogue number G36T15N were spaced, at 150 mm centers, 60 mm above a loosely packed layer of meat of maximum thickness 25 mm spread out on a metal tray. The ultraviolet lamps were enclosed in a reflective metal shield (60 cm×110 cm×10 cm) and formed an enclosed metal chamber with the meat tray. The meat was exposed to the ultraviolet lamps for six minutes. The meat sample (3) was placed in a rotating bowl ("silent cutter") and comminuted with the same addition of iced water, acetic acid, salt and EMELKUT as set out in Example 1 above.

It was found that the temperature of the meat rose 4°–5° C. during the comminuting step and partly for this reason the bowl is kept cold. Later tests showed that when meat was treated at ambient temperature (25° C.) it failed to self-bind and the meat juices ran out during cooking.

The extracted fats and converted cholesterol products can be scraped from the inner surface of the container and discarded.

Samples 2 and 3 were taken from the meat mass following the comminuting step and their fat and cholesterol levels were analyzed and compared with the levels of fat and cholesterol in the untreated Sample 1 as set out below in Table 1.

TABLE I

|  | Moisture % m/m | Fat % m/m | Ash % m/m | Protein % m/m | Cholesterol mg/100 | Total Energy Kilojoules/100 gm |
|---|---|---|---|---|---|---|
| Leg Lamb* | 64.0 | 18.0 | — | 18.0 | 70 | — |
| Sample 1 | 74.5 | 5.1 | 1.0 | 19.3 | 66 | 380 |
| Sample 2 | 81.5 | 0.8 | 2.0 | 15.4 | 46 | 291 |
| Sample 3 | 75.1 | 1.5 | 1.1 | 22.2 | 45 | 311 |

Total energy = % FAT × 37 + % PROTEIN × 17 Kilojoules/100 gm
*Taken from Geigy Scientific Tables The method of the present invention was then tested on Smallgoods: Bologna, English sausages and Round Steak (hamburger meat) and the results are set out in Table 2.

TABLE 2

(Geigy Scientific Tables)

|  | % crude fat | K cal | K joule | % Cholesterol |
|---|---|---|---|---|
| Bologna (standard) | 27.50 | 304 | 1270 |  |
| Treated by the method of the present invention | 1.19 | 71 | 297 |  |
| English Sausage (standard) | 32.10 | 372 | 1560 |  |
| Treated by the method of the present invention | 1.00 | 82 | 340 |  |
| Round Steak (Standard) | 19.50 | 196 | 820 | 0.12 |
| Treated by the method of the present invention | 0.40 | 73 | 309 | 0.021 |

It can be seen from Tables 1 and 2 that the method of the present invention is effective in substantially reducing the portions of fat and cholesterol in meat and in addition lowering the level. It has been found over a number of tests on different kinds of meat that the fat level in meats after trimming can be reduced to 1-2% and the cholesterol level reduced by a further 10-60% from the levels present in the trimmed meat.

The meat product of the present invention requires no added starch binder to hold it together and can be formed into smallgoods hamburger steaks, rib eye, cutlets and schnitzels. Additional flavorings in the form of spices can be added during the comminuting step so that the meat product can be directly formed into smallgoods.

The ultraviolet rays act to convert the cholesterol to a precursor 7 dehydrocalciferol by a balanced reversible reaction, and then by a balanced reversible heat reaction to a vitamin D3 cholecalciferol component into insoluble vitamin D3.

Whilst the process is not fully understood, scientific opinion suggests that the binding and smooth texture of meat products formed by exposure of the meat to ultraviolet light is due to polymerization of the unsaturated fats and fatty acids caused by free radicals generated by the ultraviolet light which is similar to polymerization of acrylics and vinyl compounds.

The creation of free radicals stops immediately when the ultraviolet light is switched off. Free radicals have an incredibly short life, (about a nanosecond), and recombine to form normal valencies or rearrange to form a more stable molecule the route of which is regulated by stability of intermediates, and the smallest energy steps possible.

It will be understood that modifications to the method can be made. For example, the intensity of the ultraviolet rays, their height above the layer of meat, the period of time of exposure of the meat to ultraviolet rays, the thickness of the meat, whether the meat is minced or thinly sliced, the type of edible acid used and the quantity of water, edible acid, salt and edible phosphates used can all be varied, without departing from the scope of the present invention.

The method of the present invention is applicable to the processing of meats of ovine, bovine and swine as well as poultry and sea food. In addition it has been calculated that mass processing of meat on a moveable conveyor would be possible using a bank of high intensity ultraviolet lamps of 8350 microwatts/cm$^2$ at 25 mm rating, catalogue number G48T15N, positioned at 60 mm centers in individual reflectors so as to fully cover a layer of loosely packed meat of maximum thickness 25 mm spread out on a tray. The lamps can be placed 25 mm above the layer of meat and the meat exposed to the lamps for three minutes.

What is claimed is:

1. A process for preparing a low-fat, low-cholesterol raw meat product comprising the steps of:
   (1) arranging raw meat, containing naturally-occurring fat and cholesterol, in a thin layer;
   (2) exposing said thin meat layer to ultraviolet light;
   (3) comminuting said exposed raw meat in contact with a chilled surface in the presence of iced water, edible acid, sodium chloride, and food phosphates for a period of time whereby a portion of said fat and cholesterol are separated from said comminuted meat and adhere to said chilled surface, and then,
   (4) removing said comminuted meat from the fat and cholesterol adhering to said chilled surface.

2. The method as claimed in claim 1 wherein the meat is trimmed before step (1) and wherein said chilled surface is kept at a temperature of −10° C. to +10° C.; and between 1 and 5 liters of iced water, 50–100 grams of edible acid, 100–200 grams of salt and 20–50 grams of edible phosphates are added during said comminuting step for every 10 kilograms of trimmed meat used.

3. The method as claimed in claims 1 or 2 wherein the layer of meat is of 25 mm maximum thickness.

4. The method as claimed in claim 3 wherein the ultraviolet light is of low intensity.

5. The method as claimed in claim 3 wherein the ultraviolet light is of high intensity.

6. The method as claimed in claim 3 wherein the edible acid is acetic acid.

7. The method as claimed in claim 1 wherein said comminuting step commences after the completion of said exposing step.

8. The method as claimed in claim 1 further comprising, before said exposing step, boning and trimming the meat.

* * * * *